Aug. 7, 1956  J. P. LEFSHEIK  2,757,923
FORK LIFT TRACTOR SCALE
Filed Dec. 5, 1952  2 Sheets-Sheet 1

John P. Lefsheik
INVENTOR.

BY *Clarence A. O'Brien*
*and Harvey B. Jacobson*
Attorneys

Aug. 7, 1956  J. P. LEFSHEIK  2,757,923
FORK LIFT TRACTOR SCALE
Filed Dec. 5, 1952  2 Sheets-Sheet 2
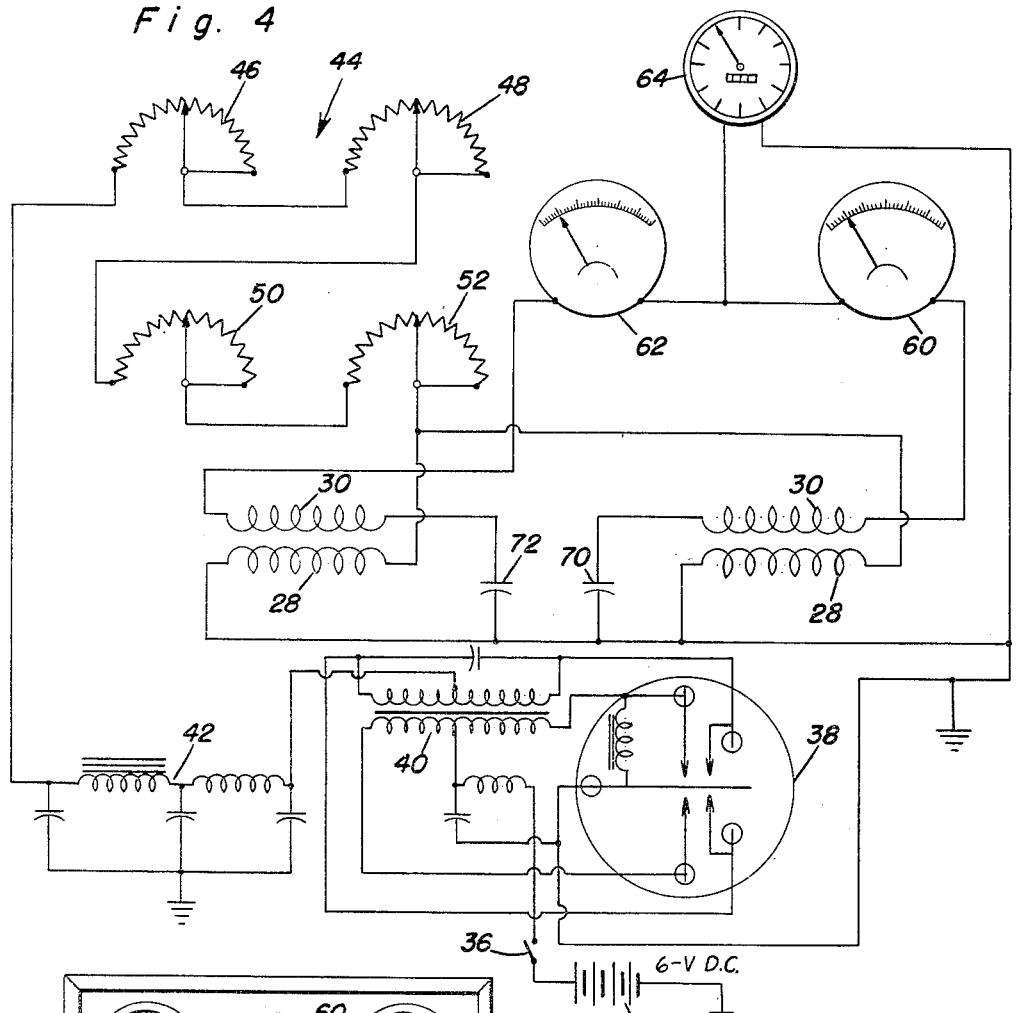
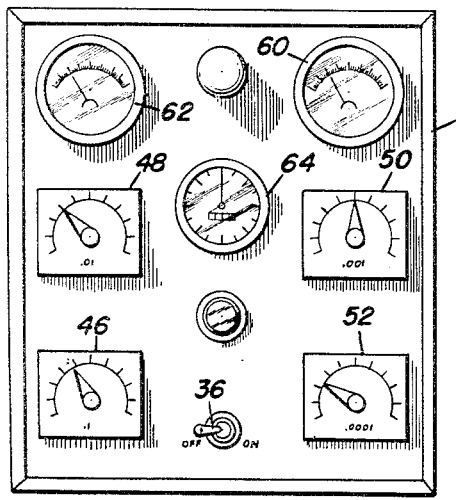
John P. Lefsheik
INVENTOR.

2,757,923

FORK LIFT TRACTOR SCALE

John P. Lefsheik, Tacoma, Wash.

Application December 5, 1952, Serial No. 324,194

3 Claims. (Cl. 265—40)

This invention relates to a fork lift tractor scale and particularly to a scale to be applied to the arms of a fork lift to determine the load carried thereby.

In the operation of fork lifts and other load carrying devices it is frequently desirable to be able to weigh the load being carried by the lift or to otherwise control the amount of load deposited or carried by the lift.

Various types of balancing scales have been attempted but these scales frequently become out of order because of the strenuous duty to which the lift must necessarily be applied.

The present invention provides a pair of coils with a magnetic or inductive coupling therebetween and a resilient or compressible medium controlling the inductance of the coils and an indicating instrument preferably directly calibrated in the load units to be handled by the lift. A multiplying factor may be applied to control the scale reading for various loads so that a full scale deflection may be secured at various weights on the fork arms.

It is accordingly an object of the invention to provide an improved fork lift tractor scale.

A further object of the invention is to provide a scale having a pair of coils the inductance of which is controlled by the load to be weighted.

A further object of the invention is to provide an inductive scale, the scale reading of which may be readily adjusted.

It is a further object to provide a simple and compact scale of good reliability for a tractor lift.

Other objects and many of the intended advantages of the present invention will be apparent from the following detail description taken in conjunction with the accompanying drawings in which:

Figure 4 is schematic wiring diagram of the scale; and,

Figure 5 is a front elevation of the control unit box for the scale.

Figure 1:
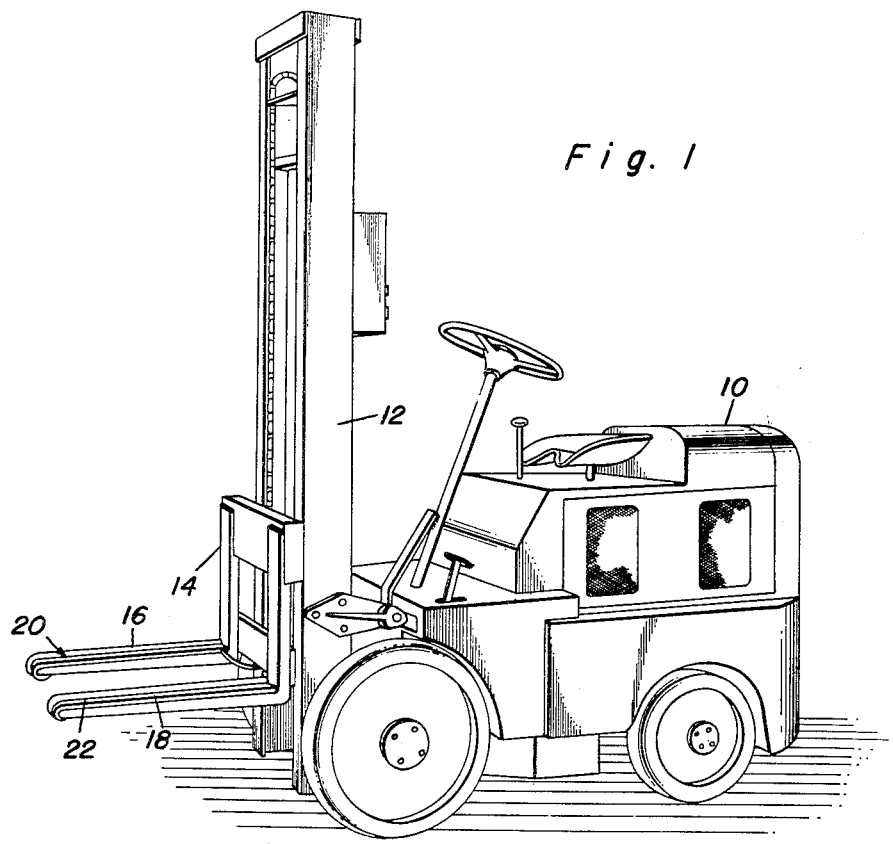
Figure 1 is a perspective view of a fork lift tractor with the scale attached.
Figure 2:
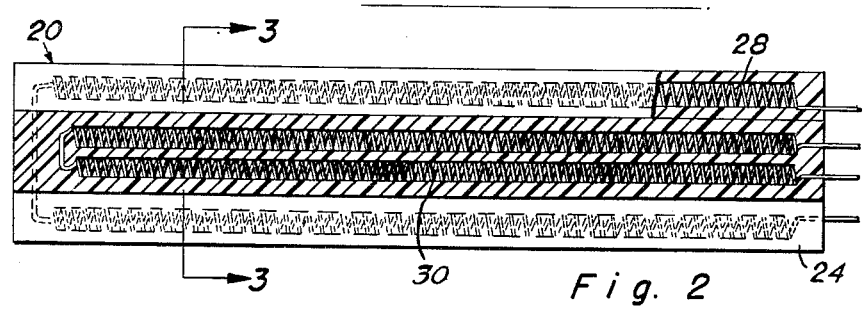
Figure 2 is a sectional plan view of the pick up element of the scale taken substantially on the plane indicated by the line 2—2 of Figure 3.
Figure 3:
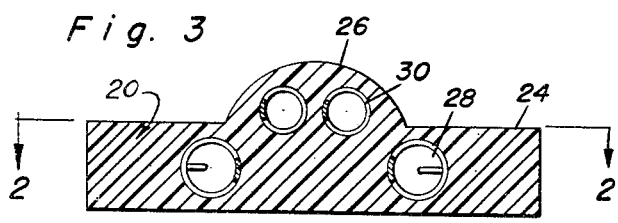
Figure 3 is a cross section of the pick up element for the scale taken substantially on the plane indicated by the line 3—3 of Figure 2.

In the exemplary embodiment according to the invention a tractor 10 is provided with a lift head 12 on which a fork 14 having a pair of fork arms 16 and 18 is adjustably mounted.

Each of the fork arms 16 and 18 has a resilient pad 20 and 22 applied thereto. Each of the pads 20 and 22 provides a resilient base member 24 and preferably with an upstanding central portion 26 that constitutes a seat on which to support a load. The primary winding 28 is mounted on the base front portion 24 of a pad while a secondary winding 30 is mounted in the upstanding portion 26 of the pad. The windings 28 and 30 have preferably multiple turn elongated windings and have an inductive coupling with each other so that alternating current may be transferred from one winding to the other by the inductive coupling. An energizing control box 32 contains the control and indicating instruments to be energized by the application of weights to the members 20 and 22. The control box 32 contains a source of direct currents such as the battery 34 which may be connected or disconnected by means of the switch 36. The switch 36 controls the supply of current to a vibration type current chopper 38 which controls the flow of current through a transformer 40. The output potential of the transformer 40 is controlled by means of a tuned impedance 42 to supply a substantially pure alternating current to a load circuit including a pair of windings 28 connected in parallel and having the current therethrough controlled by means of an impedance indicated generally at 44 and preferably including a plurality of impedance sections indicated as 46, 48, 50 and 52. The sectionalized impedance 48 provided with the sections 46 and 48 are so adjusted that each of the sections 46 to 52 may be independently adjusted with respect to each other to control the current flowing in the primary windings 28. Preferably the impedance sections 46 to 52 are graduated so that each successive section is $\frac{1}{10}$ of the impedance of the preceding section. For example, if the section 46 is $\frac{1}{10}$ of an ohm and section 48 will be $\frac{1}{100}$ of an ohm, section 50 a $\frac{1}{1000}$ of an ohm, section 52 a $\frac{1}{10,000}$ of an ohm. Obviously, any suitable ratio may be utilized as the device is intended as a multiplier for a scale presently to be described.

An inductive coupling winding 30 or secondary winding of the scale unit will be connected to a suitable indicating instrument herein indicated as an ammeter 60 which will preferably be directly calibrated in pounds, tons or other suitable indicia. The corresponding windings 28' and 30' of the other fork arm will likewise be connected to an ammeter 62 which is similarly calibrated. Preferably the joint currents from the ammeters 60 and 62 are carried through an indicating instrument such as ammeter 64 which will integrate the readings of the scales 60 and 62 so that it will be possible to determine at once the loading on either of the arms 16 or 18 or the total loading on the fork.

In the operation of the scale according to the device, the load to be indicated will be applied to one or both of the arms 16 or 18 of the fork lift 14 and the tractor will be energized to lift the arms 16 and 18 until the load is carried thereby. The load will cause a compression of a material in the base 24 and 26 so that the coils 28 and 30 will have a relative change of position so that the inductive couplings between the coils 28 and 30 will be changed. This will cause a variation in the current in the coils 30 and 30' so that the indicating instrument 60 and 62 will be controlled thereby. When a large load is to be weighed all of the impedance sections will be inserted in series with the windings 28 and 28' so that the compression of the material in the knob 26 and the base 24 will produce a minimum deflection of the ammeters 60 and 62 as well as the instrument 64. When a lesser load is to be applied, one or more of the sections 46 to 52 will be adjusted to remove all of a portion of the impedance thereof from the circuit so that a multiplying factor will be applied to the scale and a relatively lesser load will produce the same deflection as the greater load when the impedance was in place. It will thus be apparent that the sections 46 to 52 may be utilized to control the multiplication of the meters 60, 62 and 64 as may be desired. It being necessary only to know the multiplication factor of the various impedances to determine the load actually carried by the scales. Obviously, the instruments 60, 62 and 64 may be provided with a plurality of scales so that when the various sections of the impedance 44 are in use the scale corresponding thereto may be directly utilized.

Preferably the coils 30 and 30' are protected by series capacitors 70 and 72 to prevent the circulation of direct current in the ammeter circuits.

It will thus be apparent that the present invention provides a readily utilizable fork lift scale having few and simple parts and which are substantially impervious to rough handling so that the scale will be calibrated over long periods of use. Further, the scales will have a multiplication factor so that either light or heavy loads may be accurately indicated as may be desired.

While for the purpose of exemplification a presently preferred embodiment of the invention has been shown and described according to the best present understanding thereof, it will be apparent that changes and modifications may be made in the construction and arrangement of the parts thereof without departing from the true spirit and purpose of the invention.

What is claimed as new is as follows:

1. In a fork lift, a lift head, a fork movable on said head for lifting a mass, a pad of resilient material secured on said fork to be engaged by the mass placed thereon, a primary winding, a secondary winding, said primary and secondary windings being arranged in spaced insulated relation in said resilient pad, said pad having an upstanding portion in which one of said windings is disposed, said upstanding portion constituting a seat on which the mass is adapted to be mounted, and means for impressing an alternating potential on said primary winding whereby the weight of the mass on said seat moves said coils closer together so that the weight may be detected in the secondary winding.

2. In a fork lift, a lift head, a fork movable on said head for lifting a mass, said fork including a pair of spaced legs, a deformable pad on each of said legs, a pair of inductively coupled windings arranged in spaced insulated relation within each of said pads, each pad including a base member in which there is one winding and an upstanding portion in which there is another winding, said pads being deformable by the application of weight thereto to move said upstanding portion with its winding closer to the winding in said base member to thereby modify the coupling between the windings, and means for applying an alternating current to one winding of each pair of said windings, whereby the weight of a mass on said fork legs may be detected in the other winding of each pair.

3. A load detecting element comprising a resilient pad having a base member together with an upstanding portion constituting a seat on which to support a load, a pair of inductively coupled windings separated by portions of said pad, one of said windings being located in said upstanding portion and the other of said windings being disposed in said base member, a source of alternating potential connected with one of said windings whereby the weight of a deforming mass on said seat may be detected in the other winding by the increase in inductance as said windings are moved closer to each other.

References Cited in the file of this patent

UNITED STATES PATENTS

| | | |
|---|---|---|
| 1,407,078 | Murray | Feb. 21, 1922 |
| 1,493,713 | Tykocinski-Tykociner | May 13, 1924 |
| 1,584,613 | Comstock | May 11, 1926 |
| 2,117,894 | Lenehan | May 17, 1938 |
| 2,183,078 | Kenler | Dec. 12, 1939 |
| 2,457,902 | Jones | Jan. 4, 1949 |
| 2,472,214 | Hurvitz | June 7, 1949 |
| 2,564,784 | Jones | Aug. 21, 1951 |
| 2,597,831 | Willis | May 30, 1952 |
| 2,631,027 | Payne | Mar. 10, 1953 |
| 2,638,336 | Wetsel | May 12, 1953 |
| 2,651,762 | Snow | Sept. 8, 1953 |
| 2,670,195 | Baker | Feb. 23, 1954 |

FOREIGN PATENTS

| | | |
|---|---|---|
| 93,230 | Austria | June 25, 1923 |